United States Patent [19]

Huisman et al.

[11] 4,384,012
[45] May 17, 1983

[54] METHOD OF MANUFACTURING A MAGNETIC RECORDING ELEMENT

[75] Inventors: Hendrikus F. Huisman; Johannes G. C. M. deBres, both of Oosterhout, Netherlands

[73] Assignee: U.S. Philips Corporation, New York, N.Y.

[21] Appl. No.: 330,623

[22] Filed: Dec. 14, 1981

[30] Foreign Application Priority Data

Jan. 6, 1981 [NL] Netherlands .......................... 8100014

[51] Int. Cl.$^3$ ............................................. B05D 5/12
[52] U.S. Cl. .................................... 427/130; 427/127; 427/132; 427/343
[58] Field of Search ................................ 427/127–132, 427/48, 343; 252/62.54; 423/634; 428/900, 694

[56] References Cited

U.S. PATENT DOCUMENTS 3,904,540 9/1975 Bennetch et al. ............... 423/634 X
4,268,540 5/1981 Scott et al. ........................... 427/127
4,303,699 12/1981 Tamura ................................ 427/127

Primary Examiner—Bernard D. Pianalto
Attorney, Agent, or Firm—Norman N. Spain

[57] ABSTRACT

A magnetic recording element with a carrier and a magnetic coating which comprises a magnetic pigment dispersed in a binder in which the sulphate ions present on the surface of the pigment particles are bound in the form of a water-insoluble salt, as well as methods of manufacturing the magnetic recording element in which the magnetic pigment or a non-magnetic FeOOH pigment from which the magnetic pigment can be manufactured is treated with an aqueous solution of a water-soluble salt the cations of which form water-insoluble salts with the sulphate ions present on the surface of the pigment particles and the treated pigment is then processed according to known methods to a magnetic recording element or in which the above-mentioned salt is mixed with the ingredients of the magnetic coating and the resulting magnetic coating lacquer is provided on a carrier and dried.

3 Claims, No Drawings

METHOD OF MANUFACTURING A MAGNETIC RECORDING ELEMENT

The invention relates to a magnetic recording element having a carrier and a magnetic coating provided thereon which comprises a binder in which magnetizable particles and possibly auxiliary substances are finely divided.

Such recording elements are generally known in particular in the form of a magnetic tape. The carrier is often a tape, but may alternatively be a disc, manufactured from a synthetic resin, for example polyester or polyvinyl chloride. Suitable and frequently used magnetizable particles are $CrO_2$ particles, Fe particles and $\gamma$-$Fe_2O_3$ particles. The Fe and $\gamma$-$Fe_2O_3$ particles may be doped with metals, for example Co, Ni, Zn, Sn, Ti or combinations thereof. A pigment of magnetizable particles is hereinafter also termed magnetic pigment. The binder is an organic polymer, for example, polyvinyl chloride, polyvinyl acetate, polyester, polyesteramide, polyacrylate, polyurethane or copolymers of at least 2 monomers selected, for example, from vinyl chloride, vinylacetate, acrylonitrile, vinyl alcohol, vinyl butyral and vinylidene chloride.

The magnetic pigment is finely divided in the binder by means of a dispersion agent. Suitable dispersion agents are, for example, lecithine, mono-esters or di-esters of phosphoric acid and alcohols which if desired may be ethoxylated, or alkylarylsulphonic acids used in a quantity from 0.5–6% by weight calculated on the quantity of pigment. Auxiliary substances in a quantity by weight from 0.1–10% calculated on the quantity of binder, may be incorporated in the magnetic coating, for example antistatic agents such as soot and lubricants such as fatty acids, fatty acid derivatives, silicone oil, vasdin, parafin and graphite. The quantity of pigment is approximately 60–80% by weight calculated on the overall weight of the magnetic coating.

In the long run the magnetic recording elements show a deterioration in magneto-acoustic properties, in particular when stored and used in moist circumstances. From applicants' Netherlands Patent Application No. 7901437 and corresponding U.S. application Ser. No. 115,258 filed Feb. 4, 1980 it is known that the deterioration in quality is caused by a gradual deposition of salts on the surface of the magnetic coating which originate from the surface of the pigment particles. In the above-mentioned U.S. patent application it is suggested to avoid this problem by pretreating the relevant $\gamma$-$Fe_2O_3$ particles with an aqueous solution of an ammonium salt. The salt initially present on the surface of the particles, for example, iron sulphate, zinc sulphate, calcium sulphate and calcium chloride, are then exchanged with the ammonium salt which is then removed in a heating process. This measure needs an extra process step namely a heating step. In addition, the removal of the ammonium must be done very carefully, which is time-consuming, since otherwise the ammonium salt remaining on the pigment may attack the pigment as a result of its slow decomposition.

It is an object of the present invention to provide a magnetic recording element in which the detrimental salt deposition on the surface of the magnetic coating is prevented or is strongly suppressed and in which furthermore the above-mentioned disadvantages of the known recording element are avoided.

Another object of the invention is to provide methods of manufacturing the above-mentioned improved magnetic recording elements which economically and technically distinguish favourably from the method known from the abovementioned U.S. patent application and in which in particular no careful cleaning or heating of the pigment is necessary.

The invention relates more in particular to a magnetic recording element of the type mentioned in the opening paragraph which is characterized in that the sulphate ions present on the surface of the particles are bound in the form of a water-insoluble salt having a solubility product of at most $10^{-8}$.

The method of the invention is based on the recognition resulting from experiments that the deterioration in quality of the magnetic recording element is caused mainly by the calcium sulphate ($CaSO_4$) and iron sulphate [$Fe_2(SO_4)_3$] present on the surface of the coating. It has been found that these salts, due to the needle-shaped crystal structure, adhere permanently to the playback head of the device, with which the recording element, for example a magnetic tape, is scanned. As is known, in playing back the recorded information such as audio or video information, the tape is guided past the playback head of the playback apparatus. The above-mentioned salts are initially present on the pigment particles and migrate in moist circumstances, in which water condenses in the micropores of the binder, towards the surface of the magnetic coating. This migration does not take place in the magnetic recording element according to the invention. The sulphate ions present on the surface of the pigment particles which originate from or belong to the above-mentioned salts are immobilised and cannot be solved in the water of condensation so that they are not transported to the surface of the magnetic coating. The immobilisation is a result of the fact that the sulphate ions in the recording element according to the invention are bound in the form of a water-insoluble salt with a solubility product in water of at most $1 \times 10^{-8}$. The sulphate ions may, for example, be bound as lead sulphates. In a preferred embodiment of the magnetic recording element according to the invention the sulphate ions are bound as the water-insoluble barium sulphate.

A suitable method according to the invention of manufacturing the above-described recording element is characterized in that a pigment of magnetizable particles is treated with an aqueous solution of a water-soluble salt the cations of which form a water-insoluble salt with the sulphate ions present on the surface of the particles, the treated pigment and possibly auxiliary substances are incorporated in a solution of the binder, the resulting magnetic coating lacquer is provided on a carrier and the solvent for the binder is evaporated.

The processing of the treated pigment to a recording element can be carried out in the usual manner. For this purpose the pigment, the binder, a dispersion agent and possibly auxiliary substances such as antistatic agents, antioxidants, lubricants and the like, together with a solvent for the binder, are thoroughly mixed and ground in a ball mill for some hours. If desired, a part of the ingredients, for example, a part of the binder and a part of the solvent, may be added to the contents of the ball mill in a second batch. The resulting dispersion is sieved and then provided in a uniform layer on a carrier such as a polyester foil in a thickness of 12 μm. The element is then dried, the solvent being evaporated. Finally the recording element is calendered, by means of which a layer thickness of the magnetic coating of a few micrometers, for example 6 μm, is obtained. Examples of useful solvents for the binders are esters such as ethylacetate, ethers, for example, tetrahydrofuran, ketones, for example, methylethylketone and methylisobutylketone, and chlorinated hydrocarbons for example 1,2-dichloroethane. Examples of suitable and frequently used binders, dispersion agents and further auxiliary substances were mentioned in the preamble of the description.

According to another interesting method of manufacturing the above-indicated improved magnetic recording element, a binder, a solvent for the binder, a magnetic pigment of Fe or $\gamma$-Fe$_2$O$_3$ particles, a water-soluble salt the cations of which form a water-insoluble salt with the sulphate ions present at the surface of the particles, as well as possible auxiliary substances, are mixed, the resulting magnetic coating lacquer is provided on a carrier and the solvent for the binder is evaporated. In this method no pretreated pigment is used. The water-soluble salt is simply mixed with the ingredients of the magnetic coating lacquer. In practice the ingredients in question are provided in a ball mill and are mixed and ground for a few hours. The resulting dispersion is filtered in the usual manner and provided on a carrier, dried and calendered. The achieved favourable results confirm the recognition gained by Applicants that the added water-soluble salt can reach the pigment particles dispersed in the binder and surrounded by molecules of the dispersion agent still sufficiently to be converted into the water-insoluble salt.

In still another method of manufacturing the improved magnetic recording element a non-magnetic pigment of FeOOH particles is treated with an aqueous solution of a water-soluble salt the cations of which form a water-insoluble salt with the sulphate ions present at the surface of the particles, the treated FeOOH pigment is converted according to known methods into a magnetic pigment of Fe or $\gamma$-Fe$_2$O$_3$ particles, which pigment, with the addition of possibly auxiliary substances, is incorporated in a solution of the binder, the resulting magnetic coating lacquer is provided on a carrier and the solvent for the binder is evaporated.

The FeOOH pigment, also known as goethite or lepidocrocite, is a known starting product for the manufacture of magnetic Fe or $\gamma$-Fe$_2$O$_3$ pigments. An iron powder (Fe) pigment can be obtained in the usual manner from the FeOOH pigment by reduction with hydrogen at an elevated temperature of approximately 350°–450° C.

A $\gamma$-Fe$_2$O$_3$ pigment can be manufactured by reducing the FeOOH pigment at a temperature of approximately 350°–450° C. with hydrogen to magnetite (Fe$_3$O$_4$) which is then oxidised to $\gamma$-Fe$_2$O$_3$ at a temperature of approximately 300°–350° C.

In a preferred form of the above described methods a water-soluble barium salt is used in a quantity from 0.1 to 2 g per 100 g of pigment. Suitable water-soluble barium salts are in particular barium chloride, barium hydroxide, barium oxide and barium acetate. The quantity used within the above-mentioned limits depends on the quantity of sulphate present on the pigment particles. A gram equivalent quantity must at least be used, so per gram equivalent of sulphate at least one gram equivalent of the soluble barium salt. As a result of the treatment with the soluble barium salt, water-insoluble barium sulphate is formed on the particles.

The invention will now be described in greater detail by means of the following specific examples.

EXAMPLE 1

Starting material is an acid-reacting aqueous dispersion of FeOOH particles obtained according to the Camras process. According to this known process, elementary iron is dissolved in sulphuric acid, the acid ferrosulphate solution is made alkaline by the addition of, for example, sodium hydroxide solution, in which formation of goethite nuclei occurs. This nuclei solution is acidified by the addition of sulphuric acid with iron, a growth of geothite crystals on the nuclei taking place in the resulting acid medium. The pH value of the dispersion was 3.0. By the addition of SnCl$_2$ to the reaction mixture according to the Carmas process, FeOOH particles were obtained which were doped with SnCl$_2$ in a quantity of 1 at.% of Sn calculated on Fe. the FeOOH pigment was filtered off and then washed a few times with water. 1 kg of the pigment was stirred in 10 liters of water to which 10 g of BaCl$_2$.2H$_2$O had been added. The treated pigment was filtered and dried in air at 120° C.

The FeOOH pigment was reduced in the usual manner with hydrogen at 350° C. to a magnetic Fe pigment which contains 1 at% of Sn and is then stabilised by treatment with an N$_2$/O$_2$ gas mixture, the Fe particles being provided with a thin oxide skin.

A comparison pigment was prepared in an analogous manner on the understanding that the FeOOH particles were not treated with BaCl$_2$.2H$_2$O.

The resulting Fe pigment was processed to a magnetic tape as follows.

The following ingredients were provided in a so-called "High Speed Dissolver", which is a mixing device having a stirrer formed by a rotatable circular plate which at the edges has lugs alternatively projecting above and below the plane of the plate:
  38 parts by weight of a 17% solution of a polyesterurethane resin obtained from adipinic acid, 1,4-butanediol and 4,4-diisocyanodiphenylmethane (trade name "Estane"), in tetrahydrofuran.
  5.5 parts by weight of a 30% solution of phenoxy resin, (type PHKJ of Union Carbide) in tetrahydrofuran and 300 parts by weight of tetrahydrofuran.

The whole was stirred for 2 hours, the following ingredients being added gradually to the mixture:
  175 parts by weight of Fe-pigment
  6.5 parts by weight of electrically conductive soot, and
  7 parts by weight of Na-salt of laurylsarcosine.

After all the ingredients had been added in the course of the above-mentioned 2 hours, stirring was continued for another 30 minutes, the whole being mixed and ground in a pearl mill with glass pearls having a diameter of 1 mm.

150 parts by weight of the above-mentioned polyesterurethane resin solution as well as 22 parts by weight of the above-mentioned phenoxy resin solution were furthermore added to the rotating pearl mill and grinding was continued for another 24 hours.

The resulting magnetic coating lacquer was sieved through a filter having a pore width of 3μ and provided on a polyester foil having a thickness of 12μ. After drying and calendering an audio signal of 6.3 Hz was written on the resulting magnetic tape and the tape was then subjected to a cyclic moisture test.

For this purpose the tape was stored for 21 days under varying climatological conditions, in which periods of 23 hours at a temperature of 40° C. and a relative humidity of 95% were alternated with periods of 1 hour at a temperature of 20° C. and a relative humidity of 50%.

After the said period of 21 days the tape was removed from the climate box and played on the usual playback apparatus in which the tape was conveyed past a playback head at a rate of 4.75 cm/sec. The resulting signal was compared with the originally written signal.

It was found that the magnetic tape in which the above-mentioned Fe pigment had been processed, showed no observable loss of signal. The magnetic tape in which the comparison pigment had been processed gave a loss of signal of 4-6 dB distributed over the tape.

EXAMPLE 2

15 g of $Ba(OH)_2.8H_2O$ were added to 10 liters of an aqueous dispersion of 1 kg of $\gamma$-$Fe_2O_3$ particles having a pH-value of 8.0. The dispersion was stirred for a few minutes and the $\gamma$-$Fe_2O_3$ particles were then sintered off and dried in air at 120° C.

The resulting pigment was processed to a magnetic tape as follows:

In a glass pearl mill with glass pearls of 1 mm diameter the following ingredients were provided:

98.5 parts by weight of pigment,
3.0 parts by weight of phosphoric acid ester (trade name Grafac RM 710),
150 parts by weight of a 20% solution of vinylchloride-vinylacetate copolymer in a mixture of 15 parts by vol. of methylethylketone, 35 parts by vol. of methylisobutylketone and 50 parts by vol. of toluene, as well as
100 parts by weight of a mixture of 15 parts by vol. of methylethylketone, 35 parts by vol. of methylisobutylketone and 50 parts by vol. of toluene.

The mixture of ingredients was stirred and ground for 2 hours, decanted from the pearl mill, filtered through a cellulose asbestos filter and uniformly provided on a carrier tape of polyester. The assembly of carrier and coating was dried and calendered, a layer thickness of the coating of 6 μm being obtained.

The magnetic tape thus manufactured was provided with an audio signal of 6.5 kHz and then subjected to the cyclic moisture test described in example 1. After the moisture test the tape was played in which it was conveyed past a playback head of the playback apparatus at a rate of 4.75 cm/sec. The output signal recorded on a recorder. In comparison with the originally written signal no loss of signal was found.

A comparison pigment which had not been treated with the above-mentioned barium salt was processed to a magnetic tape and tested in quite an analogous manner. After the moisture test a loss of signal was found of 3-6 dB.

EXAMPLE 3

The following ingredients were introduced into a pearl mill filled with glass pearls of 1 mm:

98.5 parts by weight of $\gamma$-$Fe_2O_3$
3.5 parts by weight of phosphoric acid ester
3 parts by weight of conductive soot
180 parts by weight of tetrahydrofuran,
87 parts by weight of a 17% solution of a polyesterurethane resin obtained from adipinic acid, 1,4-butanediol and 4,4-diisocyanodiphenylmethane (tradename Estane) in a mixture (1:1) of tetrahydrofuran and cyclohexanone,
25.5 parts by weight of a 30% solution of the copolymer vinylydenechloride-acrylonitrile (8:2) in tetrahydrofuran
parts by weight of isocyanate (tradename Desmodur), that is reaction product of toluenediisocyanate and 1,1,1-trimethylolpropane dissolved (75% by weight) in ethylacetate.

The mixture of ingredients was mixed and ground for 2 hours, decanted from the pearl mill, filtered through a cellulose asbestos filter and uniformly provided on a carrier tape of polyester. The assembly of carrier and coating was dried and calendered, a layer thickness of the coating of 6 μm being obtained.

The magnetic tape thus manufactured was provided with an audio signal of 6.3 kHz and then subjected to the cyclic moisture test described in examples 1 and 2. After the moisture test the tape was played in which it was conveyed past a playback head of a playback apparatus at a rate of 4.75 cm/sec. The output signal was recorded on a recorder and the value of the loss of signal (in dB) determined in comparison with the original signal prior to the moisture test.

Several magnetic tapes were manufactured in the above-described manner on the understanding that a variable quantity of a water-soluble salt which forms an insoluble salt with the sulphate ions present on the surface of the pigment is added to the ingredients of the bead mill. The results are recorded in the table below.

| test no. | added salt type | quantity with respect to pigment | deposition crystals on tape | pollution back head | loss signal |
|---|---|---|---|---|---|
| 1 | none | — | + | + | + |
| 2 | $BaCl_2.2H_2O$ | 0.3 | ± | + | — |
| 3 | " | 0.5 | — | — | — |
| 4 | " | 0.7 | — | — | — |
| 5 | " | 1.0 | — | — | — |
| 6 | $PbCO_3$ | 1.0 | ± | ± | — |
| 7 | BaO | 0.5 | — | — | — |
| 8 | Ba-acetate | 0.5 | — | — | — |

In the columns which relate to "deposition of salt crystals" and "pollution display head":
+ = significant deposition or pollution
± = low deposition or pollution
— = no deposition or pollution In the last column:
+ = loss of signal ≧ 3 dB
— = loss of signal < 3 dB.

What is claimed is:

1. A method of manufacturing a magnetic recording element, comprising a carrier and a magnetic coating provided thereon said magnetic coating comprising magnetizable particles in a binder dissolved in a solvent, characterized in that non-magnetic FeOOH particles are treated with an aqueous solution of a water-soluble salt the cations of which form a water-insoluble salt with sulphate ions present on the surface of the particles, the treated FeOOH particles are converted according to a known method into magnetic Fe or $\gamma$-$Fe_2O_3$ particles, which particles are then incorporated in a solution of the binder with the possible addition of auxiliary substances, the resulting magnetic coating is provided on a carrier and the solvent for the binder is evaporated.

2. A method as claimed in claim 1, characterized in that a water-soluble barium salt is used in a quantity from 0.1 to 2 g per 100 g of pigment.

3. A method as claimed in claim 2, characterized in that barium chloride, barium hydroxide, barium oxide or barium acetate is used.

* * * * *